May 15, 1945.  J. R. BATES  2,375,761
TREATMENT OF ALKALI METAL SALTS
Filed Oct. 18, 1944  2 Sheets—Sheet 1
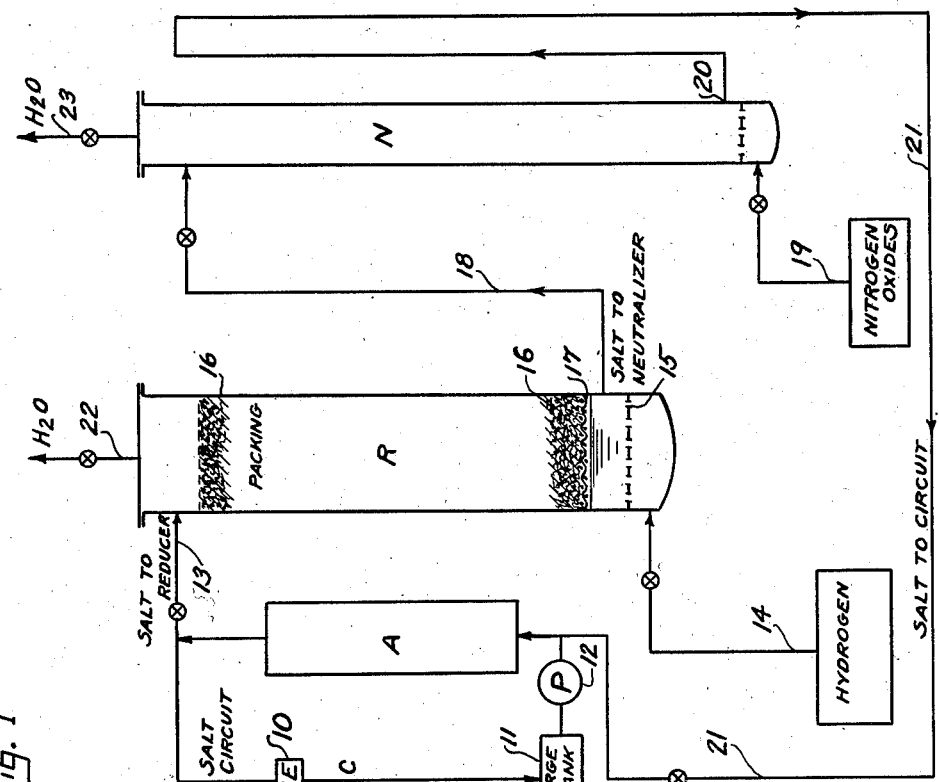
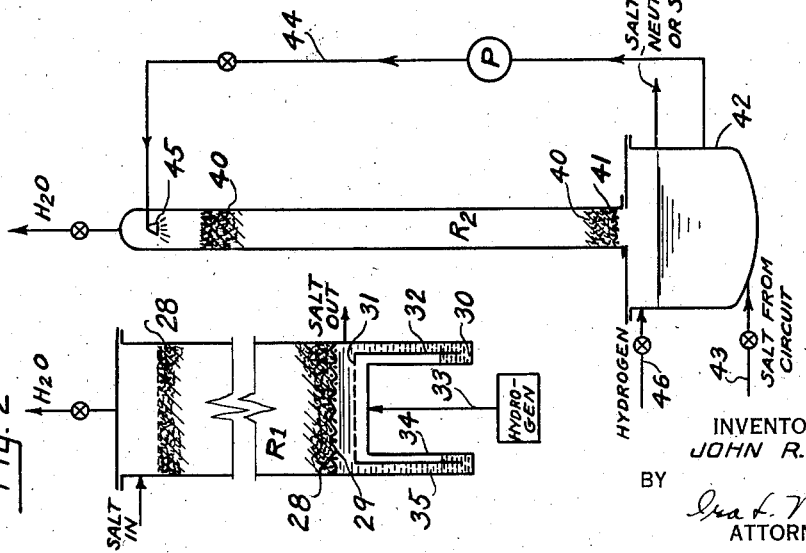
INVENTOR
JOHN R. BATES
BY
Ira L. Nickerson
ATTORNEY May 15, 1945. J. R. BATES 2,375,761
TREATMENT OF ALKALI METAL SALTS
Filed Oct. 18, 1944 2 Sheets-Sheet 2

INVENTOR
JOHN R. BATES
BY
Ira L. Nickerson
ATTORNEY

Patented May 15, 1945

2,375,761

UNITED STATES PATENT OFFICE 2,375,761

TREATMENT OF ALKALI METAL SALTS

John R. Bates, Swarthmore, Pa., assignor to Houdry Process Corporation, Wilmington, Del., a corporation of Delaware Application October 18, 1944, Serial No. 559,226

8 Claims. (Cl. 252—71)

REISSUED

The present application is a continuation-in-part of each of my applications Ser. No. 319,446, filed February 17, 1940 and Ser. No. 358,707, filed September 27, 1940.

This invention relates to methods of maintaining the desirable properties of heat transfer salts, with special reference to alkali metal salts of the oxyacids of nitrogen, and to apparatus for such methods.

Heat transfer salts which have low melting points are desirable for controlling temperatures in chemical and other equipment. Where the temperature is to be maintained between say 700° and 900° F. in the zone controlled by the salt, it is desirable for the salt to have a substantially lower melting point, so that it may be melted by the steam available, which ordinarily is at 400° F. or lower. Thus, when a plant is shut down and cooled, it is desirable to be able to melt the salt in the lines with steam in tracers. My associates and I have found that mixed nitrates and nitrites of one or more of the alkali metals are particularly suited to such uses, and upon the basis of our findings the first large plants employing such temperature controlling media have been installed. As a result of these installations, we have found that in use the properties of the salts change, resulting in an increased melting point, in the formation of deposits which in some instances partially plug some of the lines and in all cases effect a reduction of the heat transfer efficiency of the systems, and in the deposition of solid phase from the compositions.

One object of the invention is to provide method and apparatus for controlling the composition of liquids. Another object is to control the melting point of a temperature regulating salt mixture of nitrites and nitrates in a manner to maintain the mixture in readily flowable condition during use. Another object is to adjust continuously or from time to time the composition or melting point of such a salt mixture so that it remains usable for temperature control over extended periods of use. Another object is to readjust the composition or melting point of a salt mixture while it is being used in temperature control. Other objects will become apparent from the detailed description which follows:

Referring to the drawings,

Fig. 1 is a semi-diagrammatic view of one form of apparatus for carrying out the invention;

Figs. 2 and 3 are modified forms of a portion of the apparatus shown in Fig. 1.

Figure 4:
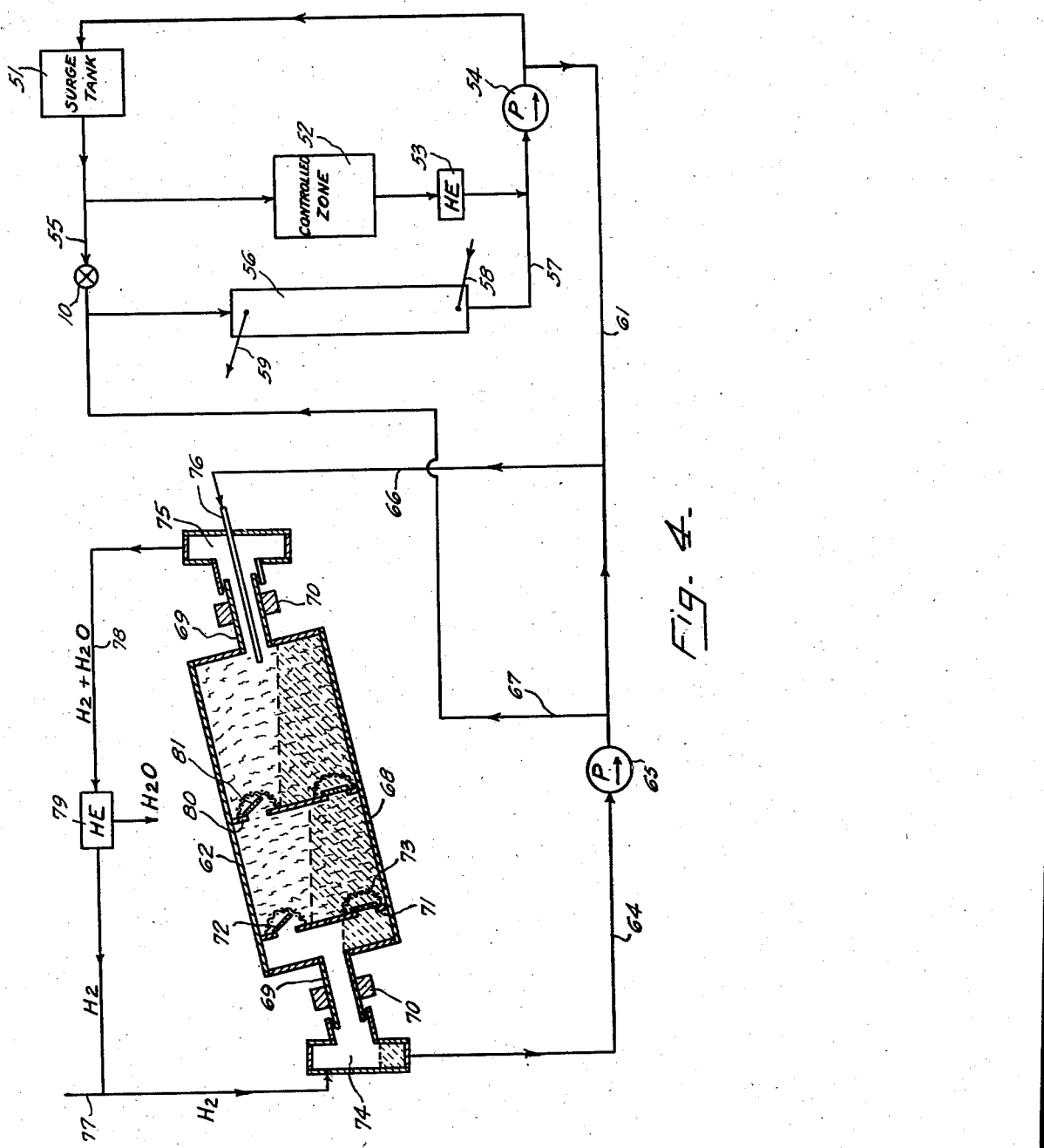
Fig. 4 is a modified form of the present invention employing recirculation through the reducer.

The present invention is particularly adaptable to commercial operations where a body of the salt mixture is circulated in heat exchange relation with apparatus which is used in carrying out various physical and chemical reactions and provides an efficient and relatively inexpensive arrangement for readjusting the composition of the mixture while it is in use in maintaining an apparatus at the desired temperature. A small portion of the mixture, depending upon the rate of rise of its melting point and the melting point at which it is desired to maintain the mixture, is tapped from the temperature regulating circuit and passed to a chamber or other suitable means where it is treated with a reducing agent under conditions to obtain a high degree of reduction of the nitrate to nitrite. From the reduction chamber the reduced mixture may be returned to the circulating system or it may be passed to a second chamber or means where it is further treated in a manner to obtain some further reduction or to remove components contained therein which might deleteriously affect the flow of the mixture through the salt circuit or give to the mixture other undesirable properties such as increasing its corrosive action. In the second chamber alkali produced during use of the salt in the indirect heat exchange system and produced during reduction is neutralized with nitric acid or with an oxide of nitrogen. Preferably salt from the outlet of the reducer is recirculated to the inlet thereof independently of the neutralizing zone or second chamber and of the heat exchange system. By operating in this manner the alkali concentration of the recirculated salt mixture is higher than the alkali concentration of the salt mixture in the heat exchange system. However, the total alkali which it is necessary to neutralize is less than if recirculation around the reducer is not employed.

The salt may be withdrawn at a rate and so treated that the alkali content of the salt in the zone of use is maintained at below about 5% alkali (calculated as NaOH) and preferably between about 0.2% and 2%. Withdrawn salt is subjected to reduction to convert nitrate to nitrite at a rate to maintain the per cent nitrate in the zone of use between about 10% and about 50%. The salt may be reduced by contacting it with a reducing gas in a recirculatory system in which a higher alkali content is maintained than in the zone of use.

In Fig. 1, A indicates any commercial apparatus which is used to carry out an industrial operation and wherein it is desired, during the operation, to control the temperature of various parts of the apparatus. Any known arrangement for circulating the salt mixture in heat exchange relation with the apparatus may be used, for example, it may be passed through conduits which are positioned in heat exchange relation with the apparatus or the apparatus may be contained in a bath of salt mixture. A circulating system generally indicated at C is provided for continuously circulating the salt mixture and the circuit may be provided with the customary heat exchanger 10 for adjusting the temperature of the mixture as well as with surge tank 11 and pump 12 for controlling the circulation.

When the salt mixture is used as a heat exchange medium its composition gradually changes and its melting point usually increases due to increase in the nitrate and decrease in the nitrite, which may be caused in some systems by oxidation from exposure to air which enters the circulating system through unavoidable leaks occurring therein as the apparatus parts expand and contract. After the melting point of the mixture has increased so much that it is difficult to circulate the mixture at the temperatures obtaining in the industrial apparatus and circulating equipment, it becomes necessary to replace the mixture with a new composition of desired melting point or to readjust the concentration of the nitrate and nitrite in the used mixture to obtain the desired melting point.

According to this invention, the melting point of the salt mixture in the circulating system is not permitted to change to the extent that any difficulty exists in maintaining the mixture in a readily flowable condition. This is effected by continuous or intermittent reduction of nitrates to nitrites, as by tapping a small portion of the mixture from the system and treating this portion while the main body of the salt is used in controlling the temperature of the apparatus and then returning the diverted portion to the main body of salt after it has been treated to increase the nitrite concentration and decrease the nitrate concentration, thus maintaining a balance between these components the same as, or substantially the same as, that of the original mixture, or in a predetermined range adjacent thereto. During the treating operation, the portion withdrawn from the main body of salt may be treated so that its nitrite and nitrate proportions are increased and decreased, respectively, to a controlled or desired degree so that when it is admixed with the main body of the salt the concentration of these components in the main body of the mixture may be accurately controlled.

Again referring to Fig. 1, a valved branch 13 extends from the main salt circulating system and is in communication with a chamber R at a point adjacent its top so that a predetermined amount of the liquid may be tapped from the system for passage intermittently or continuously downwardly through the chamber to be contacted by a reducing medium for changing nitrates to nitrites. Any known or desired reducing medium may be used, for example, hydrogen, hydrocarbons, a hydrocarbon-hydrogen mixture, ammonia gas, etc. As is indicated in the figure, hydrogen is preferred as the reducing agent and it is supplied to the chamber R at a point adjacent its bottom through the valved line 14 and passes upwardly through a gas dispersion means which is preferably a finely perforated metal plate 15, but which may be any perforated or porous material capable of finely dispersing the hydrogen. For the purpose of accelerating the reduction in the chamber R, a packing 16 is provided and is retained therein above the dispersion plate 15 as by a fine mesh screen 17. Any desired packing material may be used but preferably one which will withstand corrosion. Stainless steel, nickel or Monel metal give very good results and the most efficient reduction occurs when the metal packing is in the form of short, flat, helical turnings, since packing in this form provides great surface contact and permits the hydrogen bubbles to flow through the packing without material coagulation or channelling.

Before returning the reduced salt to the circulating system it is preferably passed from the chamber R to the chamber N for treatment in removing the alkali existing in the salt at this time or at least removing a sufficient amount that the flowability of the salt in the circulating system will not be adversely affected. The chamber N may be constructed generally like the chamber R but best results have been obtained when it is longer and of less diameter to provide longer contact between the fluids. The reduced salt mixture is admitted at a point adjacent the top of the chamber N as by line 18 and a neutralizing agent, such as oxides of nitrogen is admitted at the bottom of the chamber as by line 19 to pass through a dispersion element 20 similar to that of chamber R. The chamber N may, if desired, contain a suitable packing material to increase surface contact between the fluids as they pass countercurrently through the chamber, but sufficient excess alkali may be removed readily without resorting to this expedient. From the chamber N the salt is returned through the line 21 to the circulating system C where it is mixed with the main body of salt. The salt supply lines to and removal lines from the treating cases R and N are arranged so as to maintain the cases substantially full of salt during the treating operations.

In Fig. 2 is shown a modified form of reduction chamber which may be substituted for the chamber R in Fig. 1. This chamber, generally indicated at R1 is constructed in a manner which adapts it to use a floating or movable hydrogen dispersion plate, for example, one constructed of unglazed porcelain or other porous material which if rigidly secured might be broken or damaged during use due to temperature changes in the chamber and the resulting unequal contraction and expansion between the chamber walls and plate. The chamber R1 is provided with suitable packing 28 which is held in place by the screen 29 and an annular well 30 is provided at the bottom of the chamber and is in communication therewith to receive salt from the chamber through the screen 29. A dispersion plate 31 is disposed below the screen 29 and is provided with an annular flange 32 which extends downwardly into the well 30 forming a liquid seal with the salt therein. Hydrogen is supplied below plate 31 by line 33 and will pass through the dispersion plate 31 when the back pressure of the hydrogen on the leg 34 of the seal is less than the pressure of the salt on the leg 35 of the seal. The screen 29 functions additionally to limit the extent of upward movement of the plate 31.

In carrying out the invention, a salt mixture is passed through the circulating system C in order to control the temperature of the industrial apparatus A which may be in the range of about 400° to 1000° F., for example. A predetermined amount of the mixture, depending upon the percent rise of nitrates during circulation, is withdrawn from the circulating system through the branch 13 and admitted to the chamber R at a temperature between 750° and 950° F. and preferably, in order to obtain the most efficient reduction, will be admitted at a temperature between 800 and 900° F. If the salt mixture is used to control temperatures below 750° or 800° F. it will be necessary for the best reduction to raise the temperature of the portion withdrawn from the circulating system before it is supplied to the chamber R. As the hydrogen from the line 14 is dispersed upwardly into the chamber R it reacts with the downwardly flowing salt mixture and reduces a portion or all of the nitrate and forms additional nitrite as one product of the reaction, which is eventually returned with the mixture to the circulating system, and water, the other product of the reaction, which is passed from the chamber R through the line 22 in the form of steam. The reduced mixture is then passed through the line 18 to the chamber N at substantially the same temperature at which the reduction is carried out or at a temperature which will effect the total or any desired partial removal of the alkali content of the reduced mixture when it is reacted with oxides of nitrogen. Either NO or $NO_2$ alone or equi-molal mixtures may be used for removing a desired portion of the alkali. When NO alone is used the concentration of nitrites in the mixture is increased since the alkali changes to nitrite and some of the nitrate present in the mixture is also reduced to nitrite which lowers the nitrate concentration. When a mixture of NO and $NO_2$ in equal proportions is used, only the alkali is changed to nitrite and the nitrite concentration of the mixture is therefore increased while the nitrate concentration remains unchanged. When $NO_2$ is used alone, the alkali changes to nitrite and nitrate and the balance of these components of the mixture remains substantially unchanged. As the neutralizing reaction is carried out in the chamber N, water, which is the other product of the reaction, is removed through the line 23. Some metals suitable for equipment for circulating the mixture can withstand up to 5% of alkali without being adversely affected and this amount can be tolerated in the circulating system without adversely affecting the flowability of the mixture. Accordingly at times the neutralizing chamber N may be by-passed during the treating operation and the reduced mixture returned directly to the circulating system. However, in order to prevent the building up in the circulating system of too large a percentage of alkali, a portion of the alkali formed in the reduction chamber R is preferably removed, as in chamber N, before returning the mixture to the circulating system. The neutralization step is preferably regulated so that at least .2% and up to 2% or somewhat more of alkali remains in the mixture when it is returned to the circulating system, since, as heretofore mentioned, such amounts of alkali do not affect the circulation of the mixture adversely and in addition it has been found that small amounts of alkali increase the rate of reduction when the salt is passed to the chamber R.

Fig. 3 shows a modified form of apparatus and method of effecting reduction of the salt portion from the main circulating system. In this form of the invention, the salt mixture from the circulating system is sprayed into the chamber above the packing to form thin films of salt thereon and the hydrogen is supplied at the bottom in an undispersed state so that the salt films on the packing are completely surrounded by a continuous phase of hydrogen. The chamber $R_2$, like chamber R of Fig. 1, contains a packing 40 which is adapted to provide the greatest degree of surface contact for the fluids and is held in the chamber by means of a screen 41. Salt is supplied to a reservoir 42 through the line 43 from the salt circuit and will be forced to pass from the reservoir through line 44 and be admitted near the top of the chamber $R_2$ where it is dispersed into the packing by a spray 45. Hydrogen is supplied to the chamber $R_2$ from the line 46 at a point above the level of the salt in the reservoir 42 and, passing through the screen 41, flows upwardly in continuous phase through the packing to react with the salt mixture and reduce the nitrate concentration.

In the flow sheet designated as Fig. 4 a plant salt circuit is shown including serially in a recirculating cycle a surge tank 51, a controlled zone 52, a heat exchanger 53 and a pump 54 for returning salt to the surge tank. Suitable salt lines interconnect the equipment in the circuit for the conveyance of the salt. It is to be understood this circuit is merely illustrative of a zone in which the salt is used and forms no part of the present invention, and that it may be changed in any desired way to suit the needs of the plant by addition to or omission of some of the equipment shown.

Through a bleeder line 55, salt is withdrawn from the circuit, and passed to a treater 56, for reduction or lowering of the alkali content, from which it is reintroduced into the circuit through a line 57. Preferably, an acid oxide neutralizing material, such as nitric oxide (NO), nitrogen dioxide ($NO_2$) or nitric acid ($HNO_3$) is introduced into the lower end of the treater, whereby the alkali in the salt is neutralized, and in the case of the nitrogen oxides, by which term it is intended to include their acids, converted into an alkali metal salt of an oxyacid of nitrogen. The treating material for the neutralization may be introduced into the treater through the line 58, and waste gas may pass out of the treater through vent 59. The reduction of the alkali content, may, if desired, be effected by treatment with other acid oxides, as for instance, with silica, alumina, or silica alumina gel. In case solid acid oxides are employed the oxides may be placed as a packing material in the treater 56 through which the salt is flowed. The solid acid oxides alone may be employed or they may be employed in combination with oxy acids of nitrogen introduced through line 58. It should be noted that the molten material may carry suspended solids.

It is preferred that the treater 56 be operated either continuously or intermittently at a rate to maintain the alkali in the plant salt circuit at less than about 5% (calculated as NaOH) of the total salt, and generally for most efficient operation at between about 0.2% and 2%. In many systems it is undesirable for the alkali content to be allowed to rise above 2% for any extended time, due to the tendency to deposit scale and to deposit in the cooler portions of the system, though under some operating conditions the content may be maintained at above about 2% and below 5% without disadvantages resulting therefrom. The most desirable upper limit of alkali will of course depend upon the specific conditions to which the salt is subjected in the zone in which it is employed, in particular the temperatures to which the salt is allowed to drop. In a system in which the alkali has been allowed to build up above 2% and in which it is desired to maintain the alkali within the preferred range, the neutralizer is operated at a rate to lower the alkali content to within the preferred range.

For conservation of equipment, it is desirable that the pressure drop between the points at which the lines 55 and 57 are connected be sufficient to maintain circulation through the neutralizer 56.

Salt is withdrawn from the plant circuit and by-pass, being conveyed, preferably from the plant circuit, to a reducer 62 by a line 61. In the reducer 62, the salt is reacted with hydrogen, and for most rapid reduction the temperature is maintained above about 750°. The reducer 62 is located in a recirculating system in which the salt is conveyed by a line 64 from the reducer to pump 65 and from the latter to the former by line 66. When alkali-metal nitrates and nitrites are contacted in molten state with hydrogen, some of the nitrate is reduced to nitrite. While this reduction is the principal reaction occurring there is some free alkali formed. The alkali here formed is neutralized to maintain the alkali in the zone of use at desirably low value. It has been found desirable to recirculate the salt as described in the reducer, whereby a high alkali content may be built up and maintained in the reducer. This high alkali content decreases the production of alkali relatively to the amount of reduction occurring. Accordingly, the alkali content in the recirculating reducer system is built up to and maintained at a concentration above the concentration of alkali in the zone where the salt is used, and preferably at a concentration above 1%. By this means it is possible to save considerable initial investment in the neutralizer due to the smaller size required, and to save considerable in operating expense due to more efficient consumption of neutralizing material.

Salt is drawn off from the reduction system at a rate to compensate for the feed to this system, and is returned to the plant circuit preferably by feeding it through line 67 to the neutralizer. Introduction of this high alkali salt directly into the neutralizer with the salt by-passed from the circuit results in high efficiency, since it has been found in the neutralization of these molten salts the rate of neutralization increases with increasing concentration of alkali.

In the type of reducer shown in Fig. 4 a packing material is dipped into a body of the molten salt to be reduced. The packing is then withdrawn from the body of salt, and, while still hot and carrying a film of molten salt, is exposed to contact with an atmosphere containing hydrogen superposed on the body of salt whereby reduction is effected. The dipping and exposing are repeated until the reduction has been effected to the desired extent. Any desired packing material may be employed which is not attacked by the salt being treated such as Raschig rings or steel turnings.

The reducer 62 shown involves an inclined drum 68, carried by hollow trunnions 69, positioned axially thereof. The trunnions are supported by bearings 70. A partition 71 is positioned in the drum adjacent the lower end wall and is provided with a plurality of check valves 72, on the up-stream side of the partition, the number of valves being sufficient that at least one valve is always above the liquid level. The drum is filled with packing between the partition 71 and the upper end wall. Screens 73 are provided to cover the check valves 72 and thereby prevent the packing from interfering with the operation of the valves. A receiver 74, for salt from the drum, communicates with the drum by a sleeve in engagement with the lower trunnion. The receiver 74 functions also as a chamber or zone for the introduction of hydrogen into the lower trunnion. A level of molten salt may be maintained in the receiver 74, whereby it functions as a surge tank for the recirculating reducer system. A similar receiver 75 for hydrogen communicates by a sleeve with the upper trunnion. A salt-introducing tube 76 is provided which extends through the receiver 75 and into the upper trunnion. The salt from the receiver 74 flows through the line 64 to pump 65 from which it is conducted by line 66 to introducing tube 76. Hydrogen is introduced by a line 77 into the receiver 74 from which it flows through the drum. Reduction of the mixed nitrate-nitrite salt results in the production of water vapor, which, in mixture with some hydrogen, flows out of the drum through receiver 75 and line 78. If desired the mixed hydrogen and water vapor may be passed through a heat exchanger 79 where the water is condensed and separated from the hydrogen which may be reintroduced into the reducer.

If desired, one or more additional partitions 80 may be positioned in the packed section of the reducer, each of which partitions is provided with a plurality of valves 81, these partitions 80 being similar to partition 71. The partitions 80 hold the salt at increasingly higher levels toward the upper end of the drum, so that the packing close to the axis of the drum will be coated with a film of salt upon rotation.

Alternatively the valve 60 may be closed, and the salt withdrawn from the plant circuit by line 61 at a rate sufficient that the amount of neutralized and reduced salt fed into the circuit is sufficient to maintain the alkali in the circuit within the indicated limits. In this case the per cent of nitrate reduced to nitrite in the salt fed to the reducing system will not be as great as in case a portion of the salt is withdrawn directly to the neutralizer. The reducer is operated either with or without recycling salt thereto at a rate to maintain the per cent of nitrate in the salt in the plant circuit in the range above stated, i. e., between about 10% and about 50% nitrate.

In a typical plant which involves the use of this invention 1,500,000 pounds of a molten salt mixture, consisting originally of 54% potassium nitrate and 46% sodium nitrite, is charged to the plant circuit. This circuit involves a plurality of catalytic converter cases, a heat exchanger, a circulating pump, and a surge tank. No treatment of this salt was required initially. The rate of change of the salt composition is apparently dependent upon many factors including among others the temperature and the magnitude of minute leaks of materials, such as hydrocarbons, oxygen and carbon dioxide into the salt system. In the plant referred to, the rise in melting point has been found to average about 4° F. per month, though for the reasons stated this will vary widely in different plants. In about ten months of use the freezing point will have risen about 40° F. from the original 288° F., but the determination is indefinite since when the salt is cooled to 400° F. a solid phase commences to appear. To maintain the total alkali (calculated as NaOH) in this system constant, thereby avoiding either increase or decrease, about 434,000 pounds of salt is passed from the plant circuit per month to the neutralizer, and reacted with concentrated nitric acid, fed at a rate below stated, which maintains the alkali at about 0.5% in the plant circuit. If lowering the alkali content is desired, say due to a rise of the alkali above about 2%, the rate of flow of both the salt and acid may be increased over that necessary to maintain a fixed alkali content. Salt is withdrawn from the circuit and passed to the reducer which is operated at a rate to maintain the nitrate ion concentration in the plant circuit preferably below about 50%. Thus, when the nitrate ion rises to 47.5% of the total salt, it is passed to the reducer circuit at a rate of 40,500 pounds per month. The salt in the reducer circuit is circulated at a rate of about 730,000 pounds per month. By maintaining the rate of the hydrogen feed sufficient to hold the nitrate ion concentration in the reducer circuit at about 10.5%, enough alkali is formed to maintain the alkali concentration at about 2.3% when the plant circuit is maintained at about 0.5%. Reduction at such a concentration of alkali effects a considerable lowering in the weight of alkali formed per weight of salt reduced over reduction at a lower alkali concentration, such as is maintained in the plant circuit. The amount of salt in the reduction circuit is maintained about constant by passing about 36,500 pounds of salt from the reducer to the plant circuit by way of the neutralizer. With the alkali concentrations stated, the average alkali content of salt fed to the neutralizer is 0.64% which being higher than in the plant circuit allows the requisite weight of alkali to be reduced with smaller equipment than if all salt for neutralization were drawn from the plant circuit. Nitric acid of 91.4% concentration is fed at a rate of 2,710 pounds per month, whereby the salt from the neutralizer has an alkali content of about 0.2% and there is an excess of about 5% nitric acid.

I claim as my invention:

1. In a process of treating a salt mixture consisting principally of alkali metal nitrate and nitrite which has been maintained in circulation in an indirect heat exchange system and in which the melting point has increased as a result of such use, the steps comprising contacting said molten mixture with a reducing agent under such conditions that the melting point of the mixture is decreased, and returning the molten mixture for indirect heat exchange.

2. In a process of treating a salt mixture consisting principally of alkali metal nitrate and nitrite which has been maintained in circulation in an indirect heat exchange system and in which the melting point has increased as a result of such use, the steps comprising contacting said molten mixture with hydrogen under such conditions that the melting point of the mixture is decreased, and returning the molten mixture for indirect heat exchange.

3. In a process of treating a salt mixture consisting principally of alkali metal nitrate and nitrite which has been maintained in circulation in an indirect heat exchange system and in which the melting point has increased as a result of such use, the steps comprising contacting said molten mixture with a hydrocarbon under such conditions that the melting point of the mixture is decreased, and returning the molten mixture for indirect heat exchange.

4. In a process of treating a salt mixture consisting principally of alkali metal nitrate and nitrite which has been maintained in circulation in an indirect heat exchange system and in which the melting point has increased as a result of such use, the steps comprising contacting said molten mixture with ammonia under such conditions that the melting point of the mixture is decreased, and returning the molten mixture for indirect heat exchange.

5. In a process of treating a salt mixture consisting principally of alkali metal nitrate and nitrite which has been maintained in circulation in an indirect heat transfer system and in which the alkalinity and melting point has increased as a result of such use, the steps comprising contacting said molten mixture with a reducing agent under such conditions that the melting point of the mixture is decreased, further contacting said molten mixture with an oxide of nitrogen until the alkalinity has been decreased and returning the molten mixture for indirect heat transfer.

6. In a process of treating a salt mixture consisting principally of alkali metal nitrate and nitrite which has been maintained in circulation in an indirect heat exchange system and in which the melting point has increased as a result of such use, the steps comprising withdrawing salt mixture from said system, maintaining a recirculating stream of said withdrawn salt mixture, passing said recirculating stream through a reducing zone in contact with hydrogen in which zone nitrate is reduced to nitrite, whereby the alkali concentration of salt mixture in said stream is maintained at above the alkali concentration of the salt mixture in the system, withdrawing salt mixture from said recirculating stream and introducing it into an alkali neutralization zone, neutralizing alkali in said neutralization zone by contacting salt mixture therein with a reagent selected from the group consisting of nitric acid vapors and an oxide of nitrogen until the alkalinity has been decreased, returning salt mixture from said neutralizing zone to said system, and maintaining said salt mixture in molten state in said contact zone and in said neutralizing zone, said recirculating stream being independent of said heat exchange system and said alkali neutralizing zone.

7. In a process of treating a salt mixture consisting principally of alkali metal nitrate and nitrite which has been maintained in circulation in an indirect heat exchange system and in which the melting point has increased as a result of such use, the steps comprising withdrawing salt mixture from said system, passing said withdrawn salt mixture through a contact zone in contact with hydrogen, passing salt mixture from said contact zone into an alkali neutralizing zone, neutralizing alkali in the salt mixture in the neutralizing zone, recirculating salt mixture from the outlet of the contact zone to the inlet thereof independently of the neutralizing zone and the heat exchange system, whereby the alkali concentration of the recirculated salt mixture is higher than the alkali concentration of salt mixture in said system, returning salt from said neutralizing zone to said system, and maintaining said salt mixture in molten state in said contact zone and in said neutralizing zone.

8. In a process of treating a salt mixture consisting principally of alkali metal nitrate and nitrite which has been maintained in circulation in an indirect heat transfer system and in which the alkalinity and melting point has increased as a result of such use, the steps comprising contacting said molten mixture with a reducing agent under such conditions that the melting point of the mixture is decreased, further contacting said molten mixture with a reagent selected from the group consisting of nitric acid vapors and an oxide of nitrogen until the alkalinity has been decreased and returning the molten mixture for indirect heat transfer.

JOHN R. BATES.